United States Patent
Watanabe (10) Patent No.: US 9,282,254 B2
(45) Date of Patent: Mar. 8, 2016

(54) IMAGE PICKUP MODULE OPERABLE TO SWITCH METHODS FOR DRIVING A LENS IN AN OPTICAL AXIS DIRECTION

(71) Applicant: FUJIFILM Corporation, Tokyo (JP)

(72) Inventor: Hirofumi Watanabe, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 7 days.

(21) Appl. No.: 14/228,624

(22) Filed: Mar. 28, 2014

(65) Prior Publication Data

US 2014/0211078 A1 Jul. 31, 2014

Related U.S. Application Data

(63) Continuation of application No. PCT/JP2012/065362, filed on Jun. 15, 2012.

(30) Foreign Application Priority Data

Sep. 29, 2011 (JP) ................................ 2011-215647

(51) Int. Cl.
*H04N 5/232* (2006.01)
*H04N 5/225* (2006.01)
(Continued)

(52) U.S. Cl.
CPC .............. *H04N 5/23296* (2013.01); *G02B 7/12* (2013.01); *H04N 5/2257* (2013.01); *H04N 5/361* (2013.01)

(58) Field of Classification Search
CPC .......... H04N 5/23296; H04N 5/23212; H04N 5/3675; H04N 5/361
See application file for complete search history.

(56) References Cited

U.S. PATENT DOCUMENTS 6,268,885 B1 * 7/2001 Ohta ................... H04N 5/23212
348/335
6,826,361 B1 * 11/2004 Yost ................... H04N 5/23212
348/345
(Continued)

FOREIGN PATENT DOCUMENTS

| JP | 08-126288 A | 5/1996 |
|----|-------------|--------|
| JP | 10-133246 A | 5/1998 |
| JP | 2005-130045 A | 5/2005 |

(Continued)

OTHER PUBLICATIONS

Japanese Office Action, dated Sep. 2, 2014, for Japanese Application No. 2011-215647, with partial English translation.

(Continued)

*Primary Examiner* — Ahmed A Berhan
(74) *Attorney, Agent, or Firm* — Birch, Stewart, Kolasch & Birch, LLP (57) ABSTRACT

An image pickup module is provided with: lenses; a lens support unit that supports the lenses in a freely movable manner in the optical axis direction; an image pickup unit that detects light from the lenses and outputs an image signal; an operation information storage unit in which information about the operating state of the image pickup unit is stored; and a lens drive control unit including a drive circuit for driving the lenses in the optical axis direction and a drive method switching circuit for switching the drive method therefor between linear drive and pulse drive. The drive method switching circuit of the lens drive control unit is made so as to switch the drive method in accordance with the operating state information stored in the operation information storage unit.

4 Claims, 8 Drawing Sheets

(51) Int. Cl.
*H04N 5/361* (2011.01)
*G02B 7/12* (2006.01)

(56) References Cited

U.S. PATENT DOCUMENTS

| | | |
|---|---|---|
| 2005/0083419 A1 | 4/2005 | Honda et al. |
| 2011/0234887 A1* | 9/2011 | Shimohata ............... G03B 3/10 348/353 |

FOREIGN PATENT DOCUMENTS

| | | |
|---|---|---|
| JP | 2006-115250 A | 4/2006 |
| JP | 2011-221519 A | 11/2011 |

OTHER PUBLICATIONS

Written Opinion of the International Searching Authority (Form PCT/ISA/237) for International Application No. PCT/JP2012/065362, dated Sep. 18, 2012, with an English translation.

* cited by examiner

IMAGE PICKUP MODULE OPERABLE TO SWITCH METHODS FOR DRIVING A LENS IN AN OPTICAL AXIS DIRECTION

CROSS-REFERENCE TO RELATED APPLICATIONS

This is a continuation of International Application No. PCT/JP2012/065362 filed on Jun. 15, 2012, and claims priority from Japanese Patent Application No. 2011-215647 filed on Sep. 29, 2011, the entire disclosures of which are incorporated herein by reference.

TECHNICAL FIELD

The invention relates to an image pickup module.

BACKGROUND ART

In recent years, a variety of electronic devices such as a PC (Personal Computer) and a PDA (Personal Digital Assistant) have increasingly adopted an image pickup function, in addition to original functions of the device. The electronic device having the image pickup function is mounted thereon with a small image pickup module. The image pickup module includes an optical system having a plurality of optical components such as a focus lens and the like, an actuator that moves the optical components so as to perform a zoom adjustment operation and an image pickup element that generates an image signal by photoelectrically converting a subject image, which is imaged by the optical system.

As the actuator, a lens drive mechanism having a voice coil motor (VCM) that is formed by mounting a magnet (a permanent magnet), a yoke and a coil at an outer periphery of the optical system has been suggested. In the lens drive mechanism, the lens is moved in an optical axis direction by the VCM, so that a focusing operation is performed.

The VCM of the image pickup module that is used for a mobile phone controls a focus position of the lens by an amount of current that is supplied to the coil. In general, at a state where the current is zero, the focusing is made at infinity and at a state where the maximum current is supplied, the focusing is made at a closest point. However, when it is intended to continuously focus on a closest subject, it is necessary to continuously supply the maximum current to the VCM, so that the power consumption may be increased. Accompanied by this, a dark current due to heat generation of the image pickup element is increased, so that an image quality may be deteriorated.

Also, while the power consumption that is necessary in the image pickup module tends to increase, demands for miniaturization/high performance of the electronic device is increasing year by year. For this reason, a technology of attempting the low power consumption while maintaining a size of the electronic device as it is by appropriately changing a control mode within a range of allowed power consumption (refer to Patent Document 1) and a technology of detecting a current temperature of the electronic device to thus switch the electronic device to a control mode corresponding to a using status of the device have been suggested.

Patent Document 1: Japanese Patent Application Publication No.: 2005-130045A

Patent Document 2: Japanese Patent Application Publication No.: 2006-115250A

However, the control disclosed in Patent Documents 1 and 2 is to switch signal processing of a drive signal of the image pickup element or a picked-up image and does not directly control the heat generation of a heat generation source. For this reason, although the power consumption can be suppressed, an effect of suppressing the heat generation is low and the increase of the dark current due to the temperature increase cannot be suppressed. Also, even when image information is corrected in post processing, it is difficult to perfectly restore the image information of a high grade.

Therefore, an object of the invention is to provide an image pickup module capable of optimally drive-controlling a lens drive unit in accordance with a use of a picked-up scene or an output image signal to thus suppress heat generation of the lens drive unit, thereby improving an image quality of a picked-up image.

SUMMARY

The invention includes following configurations.

An image pickup module including:

a lens, a lens support unit that supports the lens in a freely moveable manner in an optical axis direction, an image pickup unit that detects light from the lens and outputs an image signal, an operation information storage unit that stores therein information about an operating state of the image pickup unit, and a lens drive control unit having a drive circuit for driving the lens in the optical axis direction and a drive method switching circuit for switching a drive method of the drive circuit between a linear drive and a pulse drive, wherein the drive method switching circuit switches the lens drive control unit to an optimal drive method in accordance with the operating state information stored in the operation information storage unit.

The image pickup module of the invention optimally drive-controls the lens drive unit in accordance with a use of the picked-up scene or output signal to thus suppress the heat generation of the lens drive unit, which is a heat generation source of the image pickup module, thereby improving an image quality of the picked-up image.

DETAILED DESCRIPTION

Hereinafter, an illustrative embodiment of the invention will be specifically described with reference to the drawings.

Figure 1:
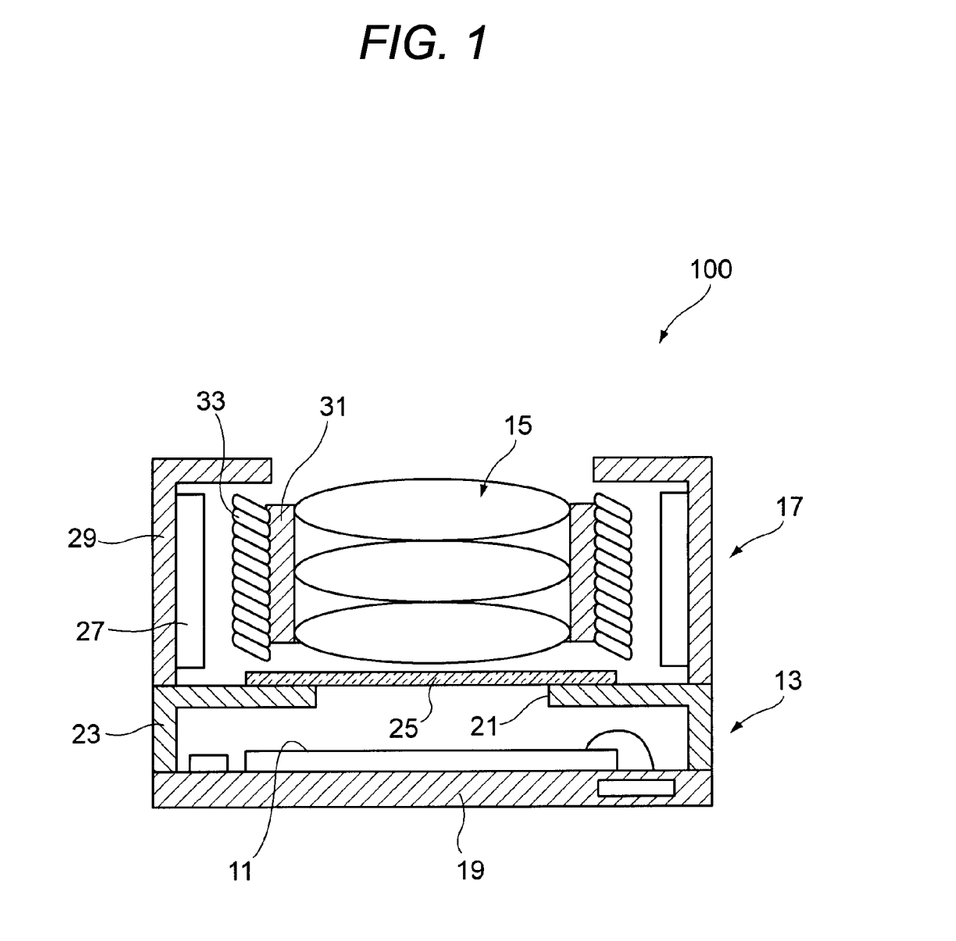
FIG. 1 is a sectional view showing a schematic structure of an image pickup module, which illustrates an illustrative embodiment of the invention.

FIG. 1 is a sectional view showing a schematic structure of an image pickup module, which illustrates an illustrative embodiment of the invention.

An image pickup module 100 includes an image pickup unit 13 having an image pickup element 11 and a lens support unit 17 that is arranged at the front of a light path of the image pickup unit 13 and supports lenses 15 in a freely moveable manner in an optical axis direction. The image pickup unit 13 includes a circuit substrate 19 having the image pickup element 11 mounted thereon, a holder 23 that is arranged to cover the image pickup element 11 on the circuit substrate 19 and has an opening hole 21 formed at a position facing at least a light receiving area of the image pickup element 11, and an infrared cutoff filter 25 that closes up the opening hole 21 of the holder 23 and is arranged to face the image pickup element 11.

The image pickup module 100 is used for an image input unit of a digital camera, a mobile phone, a TV telephone, a PC camera, a PDA (Personal Digital Assistant), an optical mouse, an interphone, a monitoring camera, a fingerprint recognition device or a toy, for example. Also, as the image pickup element, an image sensor such as a CCD (Charge Coupled Sensor) sensor, a CMOS (Complementary Metal Oxide Semiconductor) sensor and the like may be used, for example.

The lens support unit 17 includes a yoke 29 that is arranged on an upper surface of the holder 23 and has a magnet (a permanent magnet) 27 adhered on an inner periphery thereof, a lens holding member 31 that is arranged at an inner side of the yoke 29 and has a plurality of lenses, and a coil 33 that is wound on an outer periphery of the lens holding member 31, and is supported to be moveable in the optical axis direction in the yoke 29 by a support mechanism (not shown). Also, the coil 33 is supplied with driving current for moving the lenses through the support mechanism.

The magnet 27, the yoke 29 and the coil 33 function as a voice coil motor for moving the lenses 15 in the optical axis direction. A magnetic field of the magnet 27 is generated from an opposite surface to a mating surface of the magnet 27 with the yoke 29 and is directed towards a surface of the yoke 29 facing the surface from which the magnetic field is generated. That is, a direction of the magnetic field is substantially orthogonal to the winding direction of the coil 33, so that the lenses 15 are moved in the optical axis direction (an upper-lower direction of the drawing) in accordance with the current supplied to the coil 33.

In the below, a control method of driving the image pickup module 100 is described.

The voice coil motor is driven in accordance with one of a linear drive and a pulse drive. Upon the linear drive, since the current is supplied all the time, much heat is generated. However, since the linear drive is a DC drive, a noise is not generated. Upon the pulse drive (for example, Pulse Width Modulation: PWM), the power consumption and the heat generation can be suppressed by a rectangular pulse. However, the pulse drive becomes a noise source. The image pickup module 100 described hereinafter has a function of switching a drive method of the voice coil motor in accordance with an operating state of the image pickup unit, for example, a setting value of an image pickup condition and a drive hysteresis so as to suppress the heat generation from a lens drive control unit 45.

Figure 2:
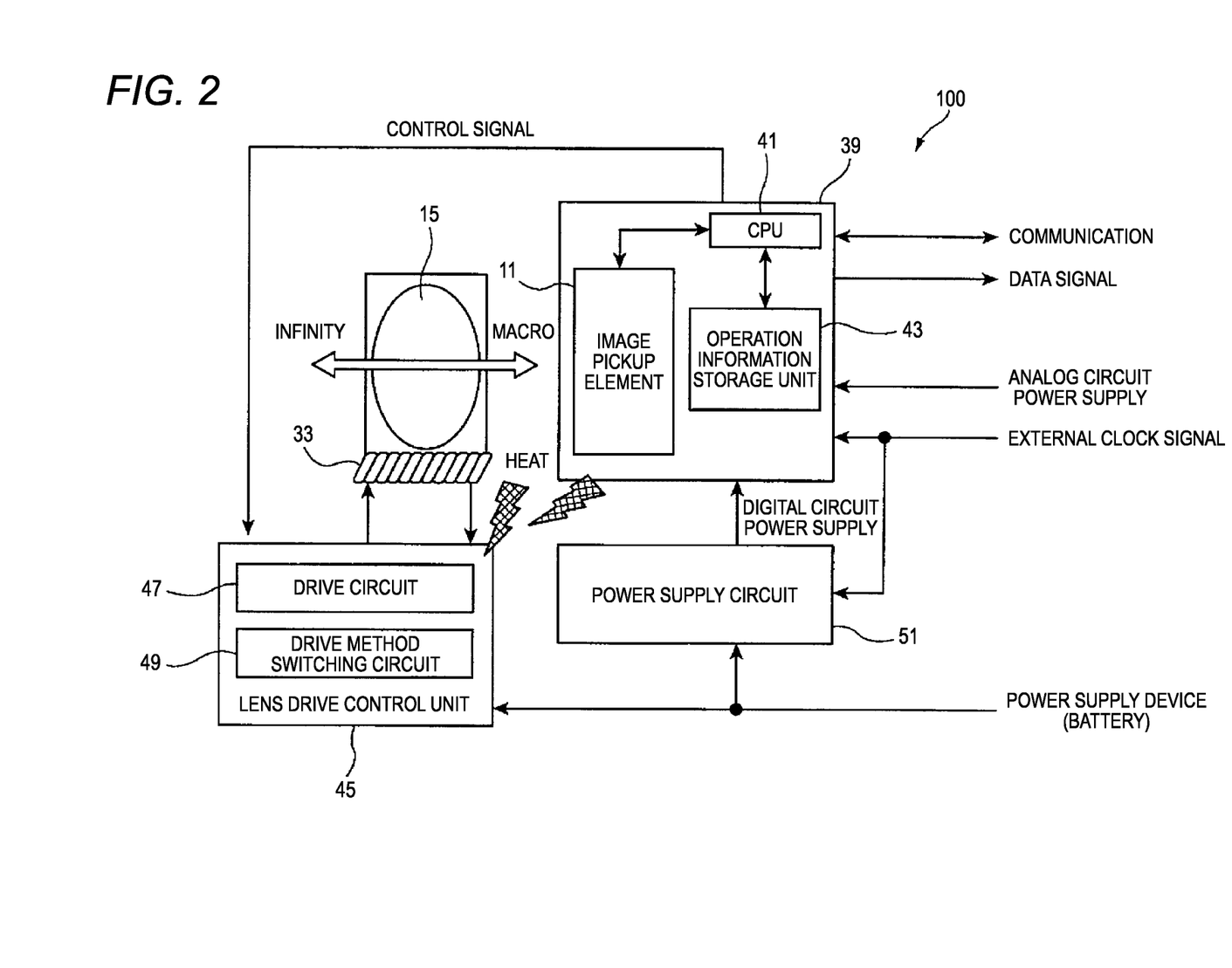
FIG. 2 is a block configuration view of the image pickup module.

FIG. 2 is a block configuration view of the image pickup module 100.

An image pickup unit 39 has the image pickup element 11, a CPU 41 and an operation information storage unit 43 and can perform communication with an external device. The image pickup element 11 outputs image information generated by detecting light from the lenses 15. The CPU 41 controls the drive of the image pickup element 11 and outputs a control signal for switching a drive method, which will be described later, to a lens drive control unit 45. The operation information storage unit 43 stores therein information about an operating state of the image pickup element 11 and provides the same to the CPU 41.

The image pickup unit 39 is input with a power supply line of an analog circuit and an external clock signal. The external clock signal is input to a power supply circuit 51, too. The power supply circuit 51 feeds digital circuit power supply to the image pickup unit 39 at predetermined timing, based on the external clock signal. The lens drive control unit 45 and the power supply circuit 51 are fed with power from a power supply device (a battery and the like).

The lens drive control unit 45 has a drive circuit 47 that outputs a drive signal of the coil 33 and a drive method switching circuit 49 that switches a drive method of the drive signal. The drive circuit 47 outputs drive current, which moves and focuses the lenses 15 in the optical axis direction, to the coil 33 on the basis of the control signal from the CPU 41 of the image pickup element 11.

The image pickup unit 39 having the above configuration is driven in accordance with communication from a device on which the image pickup module 100 is mounted. Also, the image pickup module 100 has a means (a port, an I2C (Inter-Integrated Circuit) and the like) for directly controlling the lens drive control unit 45 from the image pickup unit 39. The image pickup unit 39 switches the drive method of the drive circuit 47 by the drive method switching circuit 49 through the control signal.

<First Aspect>

A control method of switching the drive method of the lenses in accordance with a gain (ISO sensitivity) set in the image pickup element is described.

Figure 3:
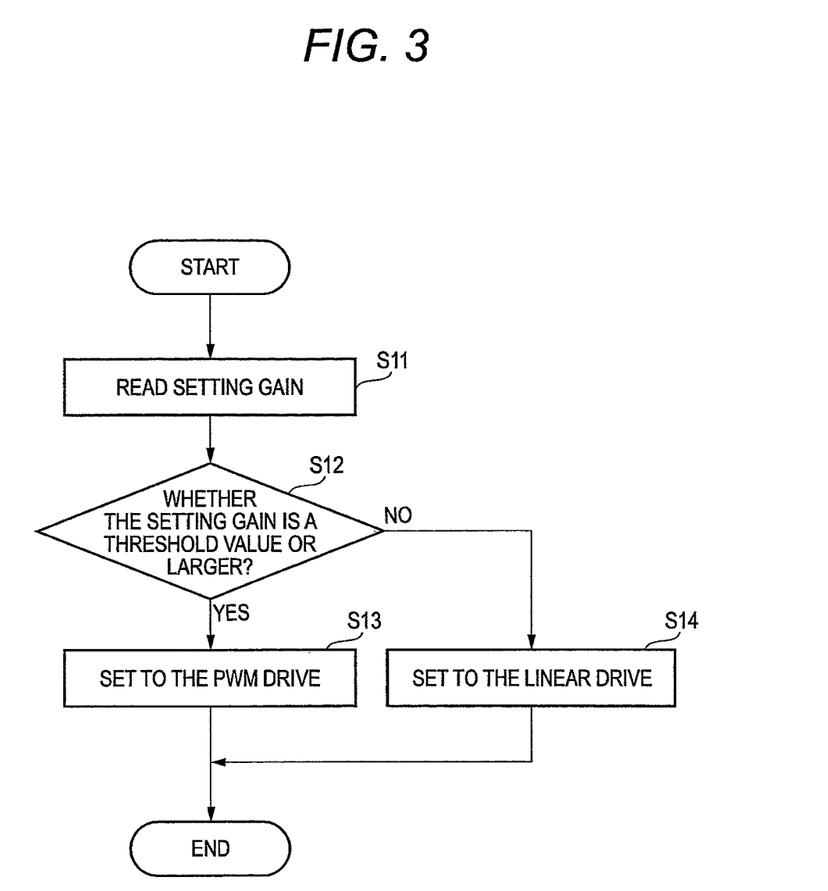
FIG. 3 is a flow chart showing a sequence of switching a drive method of a drive circuit.

FIG. 3 is a flow chart showing a sequence of switching the drive method of the drive circuit.

First, the CPU 41 reads out a setting gain, which is input to the image pickup module 100, by the communication from the device on which the image pickup module 100 is mounted. The setting gain may be a value equivalent to the ISO sensitivity that is set in the device. Then, the CPU 41 determines whether the read setting gain is a predetermined threshold value or larger (S12). When the read setting gain is the predetermined threshold value or larger, the CPU sets the drive method switching circuit 49 so that the drive method of the drive circuit 47 becomes the PWM drive (S13). When the read setting gain is smaller than the predetermined threshold value, the CPU sets the drive method switching circuit 49 so that the drive method becomes the linear drive (S14).

The threshold value of the gain may be 12 dB, for example. When the setting gain is 12 dB or larger, the CPU 41 determines a dark scene in which a noise is apt to be conspicuous and switches the drive method to the linear drive. On the other hand, when the setting gain is smaller than 12 dB, the CPU determines a bright scene in which a noise is relatively difficult to be conspicuous, and switches the drive method to the PWM drive.

Thereby, it is possible to reduce the power consumption and to suppress the heat generation of the drive circuit 47 upon the image pickup of the bright scene. Therefore, it is possible to prevent a noise from overlapping with an image signal from the image pickup element 11, which is caused due to the heat transferred from the drive circuit 47 to the image pickup element 11. Also, it is possible to reduce the noise upon the image pickup of the dark scene, so that it is possible to obtain an image of a high grade.

<Second Aspect>

Subsequently, a control method of switching the drive method of the lenses in accordance with a temperature of the image pickup element 11 is described.

Figure 4:
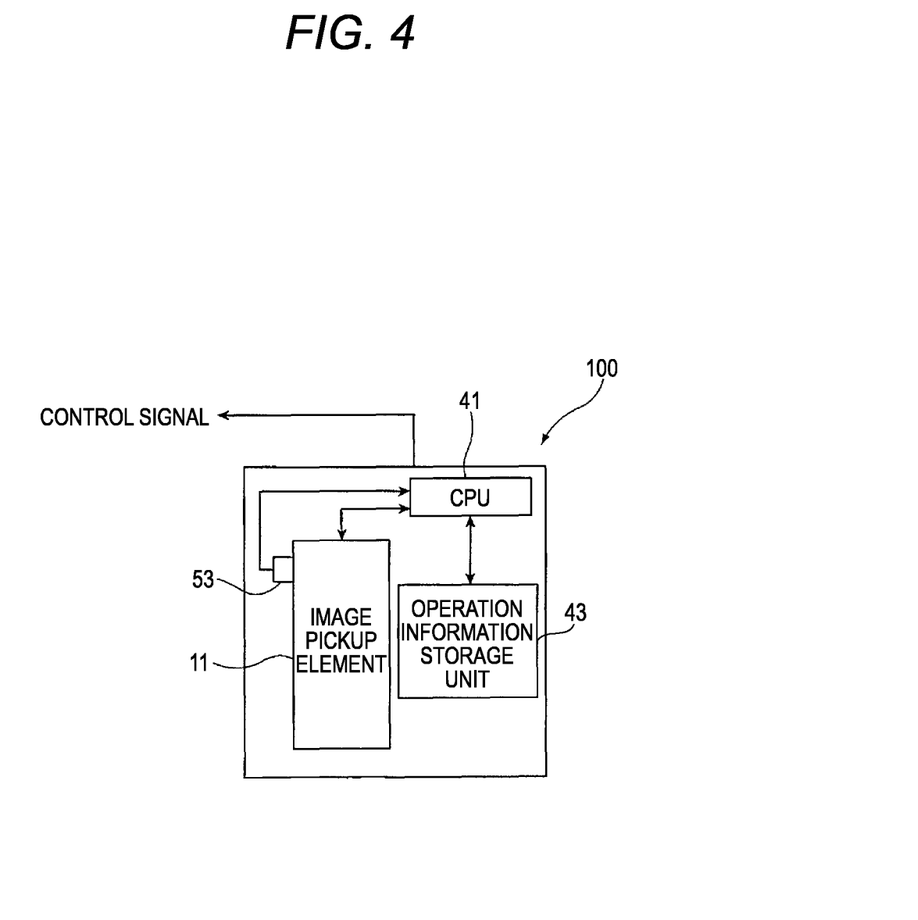
FIG. 4 is a block diagram of an image pickup unit.

FIG. 4 shows a block diagram of an image pickup unit 39A. In this configuration, the image pickup element 11 of the image pickup unit 39 is provided with a temperature sensor 53 to thus measure a temperature of the image pickup element 11. Information about the temperature detected by the temperature sensor 53 is input to the operation information storage unit 43 through the CPU 41. As the temperature sensor 53, a well-known sensor such as thermocouple or resistance temperature detector formed on the image pickup element 11 can be used.

Figure 5:
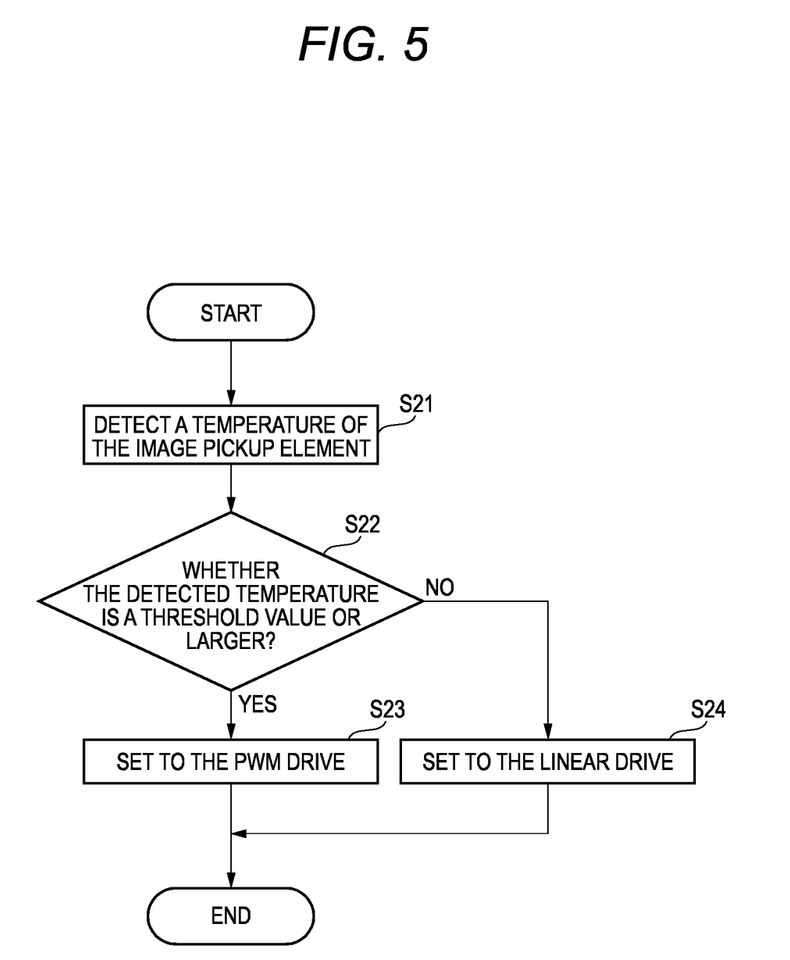
FIG. 5 is a flow chart showing a sequence of switching the drive method of the drive circuit.

FIG. 5 is a flow chart showing a sequence of switching the drive method of the drive circuit.

First, the CPU 41 detects a temperature of the image pickup element 11 by the temperature sensor 53 (S21). Then, the CPU 41 determines whether the detected temperature is the predetermined threshold value or larger (S22). When the detected temperature is a predetermined threshold value or larger, the CPU sets the drive method switching circuit 49 so that the drive method of the drive circuit 47 becomes the PWM drive (S23). When the detected temperature is smaller than the predetermined threshold value, the CPU sets the drive method switching circuit 49 so that the drive method becomes the linear drive (S24).

The threshold value of the temperature may be 60° C., for example. When the detected temperature is 60° C. or higher, the CPU sets the PWM drive that prevents the temperature increase. Thereby, it is possible to prevent the excessive temperature increase of the drive circuit 47 and to reduce the power consumption. Also, the heat generation of the drive circuit 47 is suppressed, so that the heat to be transferred from the drive circuit 47 to the image pickup element 11 is reduced. Therefore, it is possible to prevent a noise from overlapping with an image signal from the image pickup element 11. On the other hand, when the detected temperature is lower than 60° C., the CPU sets the linear drive. Thereby, it is possible to obtain an image of a high grade.

<Third Aspect>

Subsequently, a control method of switching the drive method of the lenses in accordance with a measured value of dark current of the image pickup element 11 is described.

Figure 6:
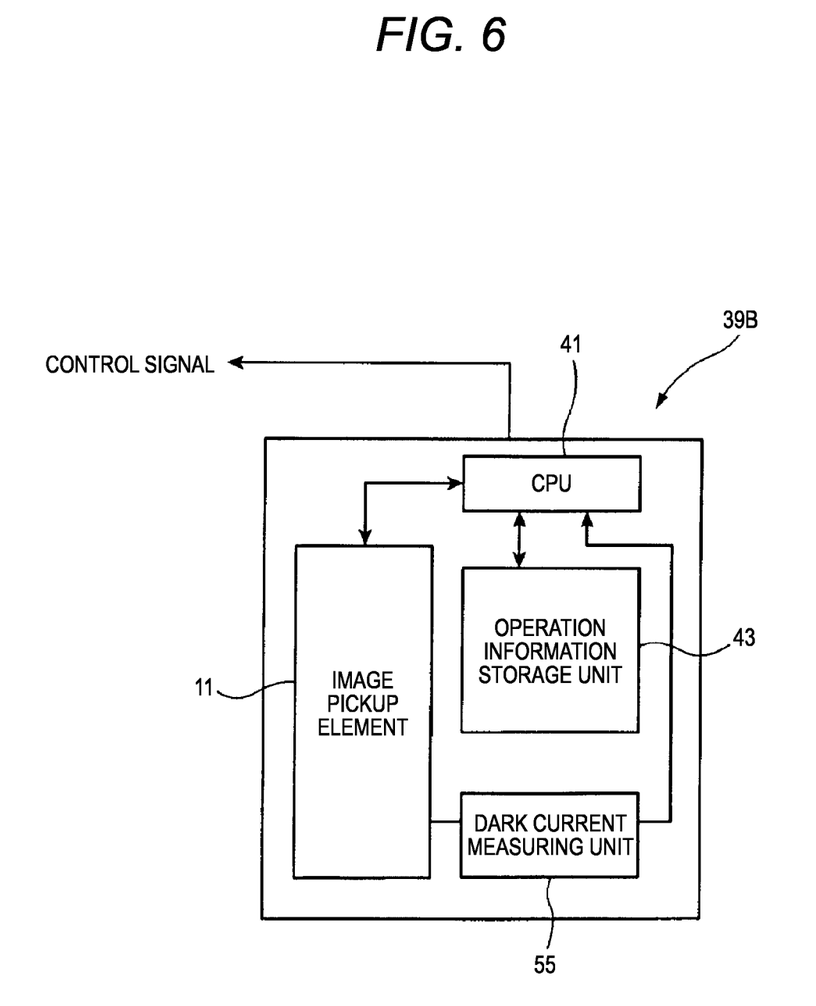
FIG. 6 is a block diagram of an image pickup unit.

FIG. 6 is a block diagram of an image pickup unit 39B. In this configuration, the image pickup unit 39 is provided with a dark current measuring unit 55 that measures dark current of an optical black part of the image pickup element 11. A dark current value measured by the dark current measuring unit 55 is input and stored in the operation information storage unit 43 through the CPU 41.

Figure 7:
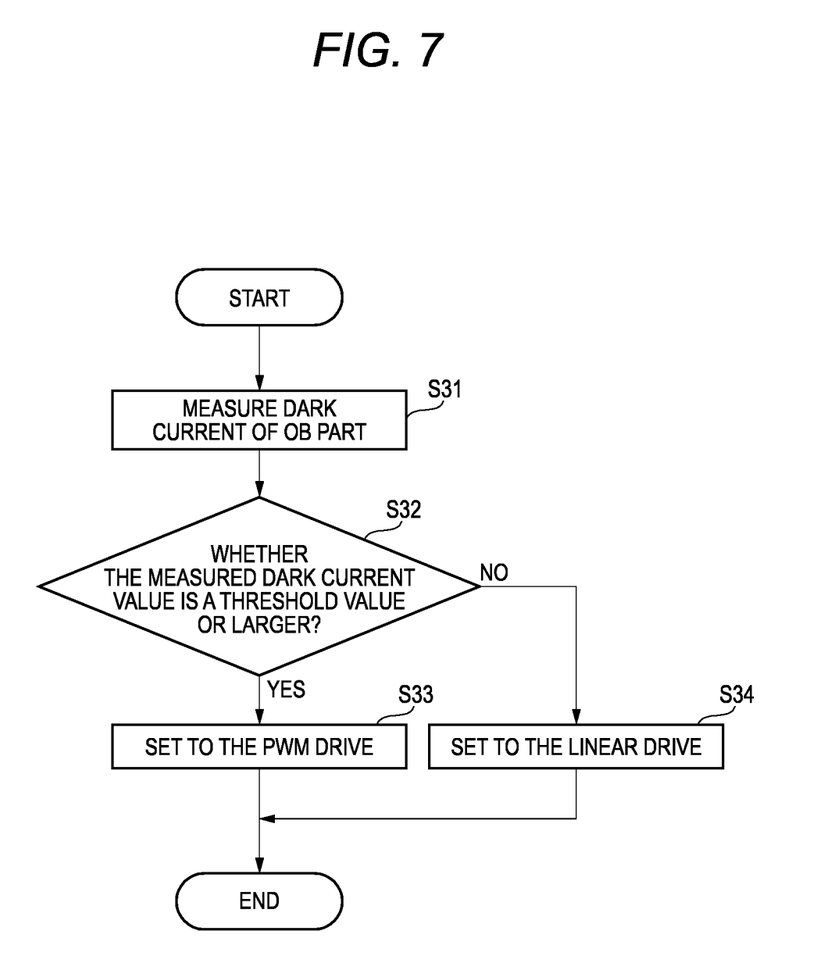
FIG. 7 is a flow chart showing a sequence of switching the drive method of the drive circuit.

FIG. 7 is a flow chart showing a sequence of switching the drive method of the drive circuit.

First, the CPU 41 measures dark current of the optical black part of the image pickup element 11 by the dark current measuring unit 55 (S31). Then, the CPU 41 determines whether the measured dark current value is a predetermined threshold value or larger (S32). When the measured dark current value is the predetermined threshold value or larger, the CPU sets the drive method switching circuit 49 so that the drive method of the drive circuit 47 becomes the PWM drive (S33). When the measured dark current value is smaller than the predetermined threshold value, the CPU sets the drive method switching circuit 49 so that the drive method becomes the linear drive (S34).

The threshold value of the dark current may be 70 LSB (10 bit A/D), for example. When the measured dark current value is 70 LSB or larger, it is possible to prevent the excessive temperature increase of the drive circuit 47 and to reduce the power consumption. Also, the heat generation of the drive circuit 47 is suppressed, so that the heat to be transferred from the drive circuit 47 to the image pickup element 11 is reduced. Therefore, it is possible to prevent the dark current of the image pickup element 11 from being further increased. On the other hand, when the measured dark current value is smaller than 70 LSB, the CPU sets the linear drive. Thereby, it is possible to obtain an image of a high grade.

<Fourth Aspect>

Subsequently, a control method of switching the drive method of the lenses depending on whether an output signal from the image pickup element is to record an image or to display a through image is described.

In this configuration, the CPU 41 shown in FIG. 2 determines whether an output signal from the image pickup element is to record an image or to display a through image, based on a communication signal input to the image pickup module 100 from a controller of the device on which the image pickup module 100 is mounted, i.e., a trigger signal of recording start or recording stop. A result of the determination is input and stored in the operation information storage unit 43.

Figure 8:
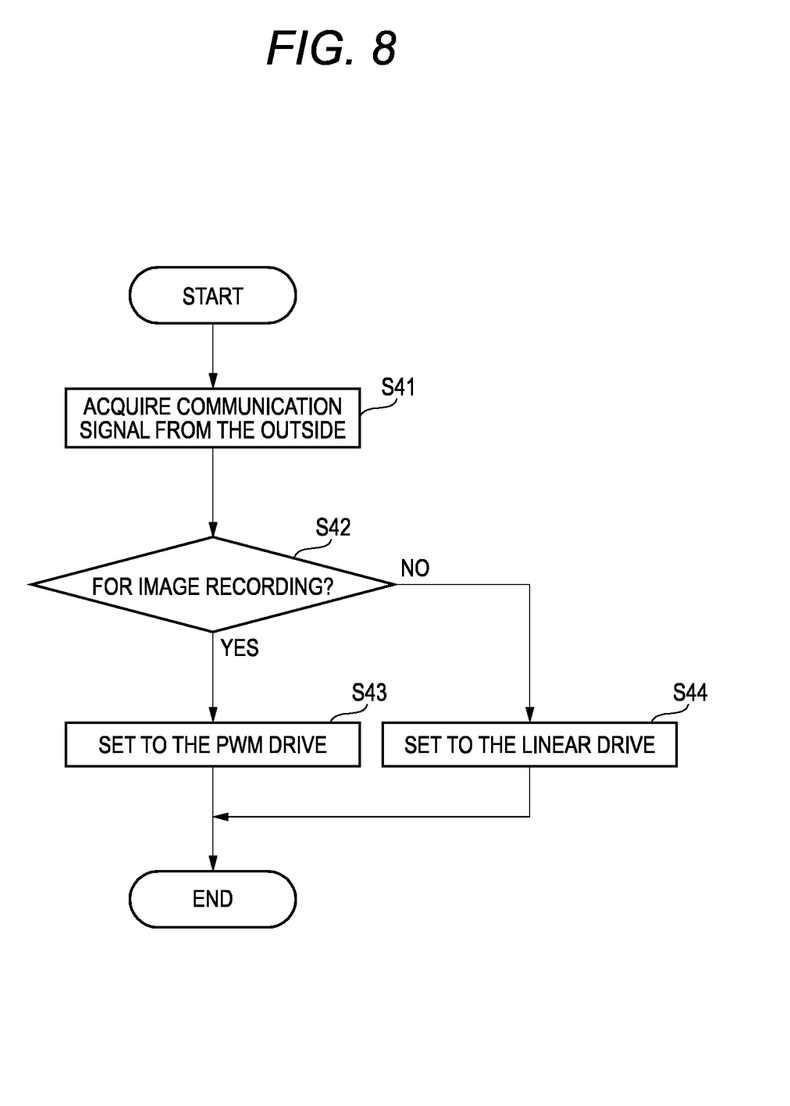
FIG. 8 is a flow chart showing a sequence of switching the drive method of the drive circuit.

FIG. 8 is a flow chart showing a sequence of switching the drive method of the drive circuit.

First, the CPU 41 acquires a communication signal that is input from an outside of an image pickup unit 39C (S41). Then, the CPU 41 extracts the trigger signal from the acquired communication signal and determines whether the output signal from the image pickup element 11 is to record an image or not (S42).

When a result of the determination indicates that the output signal is to record an image, the CPU sets the drive method switching circuit 49 so that the drive method of the drive circuit 47 becomes the linear drive (S43). When a result of the determination indicates that the output signal is to display a through image, the CPU sets the drive method switching circuit 49 so that the drive method becomes the PWM drive (S44).

Thereby, when the output signal from the image pickup element is to record an image, the drive circuit is driven by the linear drive of giving priority to an image quality, so that it is possible to obtain an image of a high grade. On the other hand, when the output signal is not for the image recording, the drive circuit is driven by the PWM drive in which the power consumption is low and the heat generation of the drive circuit 47 is considerably reduced.

Incidentally, the drive method may be switched depending on whether an output signal from the image pickup element is a moving picture or a still image, in addition to depending on whether the output signal is to record an image or not. That is, when the output signal is a moving picture, the PWM drive is set because a noise is not relatively conspicuous even though the noise exists in an image. In this case, the power consumption can be also reduced. On the other hand, when the output signal is a still image, the linear drive is set to obtain an image of a high grade.

The invention is not limited to the above-described illustrative embodiments and the respective configurations of the illustrative embodiments can be combined with each other and can be changed and modified by one skilled in the art, based on the descriptions of the specification and the well-known technologies, which are also expected by the invention and included in the scope of the invention to be protected.

For example, when the temperature of the image pickup element is the predetermined threshold value or larger, the drive circuit is not set to the linear drive but is set to the PWM drive, which preferentially suppresses the heat generation, even though the setting gain value is the predetermined threshold value or larger and the output signal from the image pickup element is to record an image. Also, even when the dark current is the predetermined threshold value or larger, the PWM drive is set, which preferentially suppresses the heat generation. In this way, when the drive method is set by combining the respective conditions, it is possible to perform the drive more appropriately.

Also, the pulse drive may be a well-known pulse drive, in addition to the PWM drive.

As described above, the specification discloses following configurations.

(1) An image pickup module including:

a lens, a lens support unit that supports the lens in a freely moveable manner in an optical axis direction, an image pickup unit that detects light from the lens and outputs an image signal, an operation information storage unit that stores therein information about an operating state of the image pickup unit, and a lens drive control unit having a drive circuit for driving the lens in the optical axis direction and a drive method switching circuit for switching a drive method of the drive circuit between a linear drive and a pulse drive, wherein the drive method switching circuit switches the lens drive control unit to an optimal drive method in accordance with the operating state information stored in the operation information storage unit.

According to the image pickup module, it is possible to improve an image quality of an output image by suppressing heat generation of the lens drive unit that is a heat generation source of the image pickup module. That is, when the drive circuit is driven by the linear drive, it is possible to obtain an image of a high grade, and when the drive circuit is driven by the pulse drive, it is possible to suppress the heat generation of the drive circuit and to thus prevent a noise from overlapping with the output image.

(2) In the image pickup module of (1), wherein the operation information storage unit stores, as the operating state information, a gain value for setting detection sensitivity of the light that is detected by the image pickup unit, and wherein the drive method switching circuit switches the drive method of the drive circuit in accordance with the stored gain value.

According to the image pickup module, since the drive method of the drive circuit is switched in accordance with the gain value set in the image pickup element, it is possible to set an optimal drive method in accordance with a picked-up scene.

(3) In the image pickup module of (2), wherein when the gain value is a predetermined value or larger, the drive method switching circuit sets the linear drive as the drive method of the drive circuit, and when the gain value is smaller than the predetermined value, the drive method switching circuit sets the pulse drive.

According to the image pickup module, for a dark scene having a large gain value, the noise can be reduced by the linear drive, and for a bright scene having a small gain value, an influence of the heat generation can be reduced to suppress the power consumption by the pulse drive.

(4) In the image pickup module of (1), further comprising a temperature sensor that detects a temperature of the image pickup unit and outputs the temperature to the operation information storage unit, as the operating state information, wherein the drive method switching circuit switches the drive method of the drive circuit in accordance with the temperature detected by the temperature sensor.

According to the image pickup module, since the drive method of the drive circuit is switched in accordance with the temperature of the image pickup element, it is possible to set an optimal drive method in accordance with the state of the image pickup element.

(5) In the image pickup module of (4), wherein when the detected temperature is a predetermined temperature or higher, the drive method switching circuit sets the pulse drive as the drive method of the drive circuit, and when the detected temperature is lower than the predetermined temperature, the drive method switching circuit sets the linear drive.

According to the image pickup module, when the temperature of the image pickup unit is high, an influence of the heat generation can be reduced to suppress the power consumption by the pulse drive, and when the temperature is low, the noise can be reduced by the linear drive.

(6) In the image pickup module of (1), further comprising a dark current measuring unit that measures dark current of an optical black part of an image pickup element included in the image pickup unit and outputs the measured dark current to the operation information storage unit as the operating state information, wherein the drive method switching circuit switches the drive method of the drive circuit in accordance with the measured value of the detected dark current.

According to the image pickup module, since the drive method of the drive circuit is switched in accordance with the dark current of the optical black part of the image pickup element, it is possible to set an optimal drive method in accordance with the state of the image pickup element.

(7) In the image pickup module of (6), wherein when the measured value of the dark current is a predetermined value or larger, the drive method switching circuit sets the pulse drive as the drive method of the drive circuit, and when the measured value of the dark current is smaller than the predetermined value, the drive method switching circuit sets the linear drive.

According to the image pickup module, when the dark current is large, the influence of the heat generation can be reduced to suppress the power consumption by the pulse drive, and when the dark current is small, the noise can be reduced by the linear drive.

(8) In the image pickup module of (1), further comprising an image determination unit that determines whether the output signal of the image pickup unit is to record an image or not and outputs determination information thereof, wherein the operation information storage unit stores the determination information from the image determination unit as the operating state information, and wherein the drive method switching circuit switches the drive method of the drive circuit in accordance with the stored determination information.

According to the image pickup module, since the drive method of the drive circuit is switched depending on whether the output signal of the image pickup element is to record an image or not, it is possible to set an optimal drive method in accordance with a type of the picked-up image.

(9) In the image pickup module of (8), wherein when the output signal of the image pickup unit is an image signal for image recording, the drive method switching circuit sets the linear drive, and when the output signal is not an image signal for image recording, the drive method switching circuit sets the pulse drive.

According to the image pickup module, when the output signal is an image signal for image recording, the noise can be reduced by the linear drive, and when the output signal is not an image signal for image recording, the influence of the heat generation can be reduced to suppress the power consumption by the pulse drive.

(10) In the image pickup module of one of (1) to (9), wherein the pulse drive is a drive method including a pulse width modulation.

According to the image pickup module, it is possible to perform the drive in which the heat generation of the drive circuit can be suppressed to reduce the power consumption by the pulse width modulation.

The image pickup module of the invention optimally drive-controls the lens drive unit in accordance with a use of the picked-up scene or output signal to thus suppress the heat generation of the lens drive unit, which is a heat generation source of the image pickup module, thereby improving an image quality of the picked-up image.

Although the invention has been specifically with reference to the illustrative embodiments, it is apparent to one skilled in the art that a variety of changes and modifications can be made without departing from the spirit and scope of the invention.

What is claimed is:

1. An image pickup module comprising:
   a lens,
   a lens support unit that supports the lens in a freely moveable manner in an optical axis direction,
   an image pickup unit that detects light from the lens and outputs an image signal,
   an operation information storage unit that stores therein information about an operating state of the image pickup unit,
   a lens drive control unit having a drive circuit for driving the lens in the optical axis direction and a drive method switching circuit for switching a drive method of the drive circuit between a linear drive and a pulse drive, and
   a dark current measuring unit that measures dark current of an optical black part of an image pickup element included in the image pickup unit and outputs the measured dark current to the operation information storage unit as the operating state information,
   wherein the drive method switching circuit switches the lens drive control unit to an optimal drive method in accordance with the operating state information stored in the operation information storage unit, and
   wherein the drive method switching circuit switches the drive method of the drive circuit in accordance with the measured value of the detected dark current.

2. The image pickup module according to claim 1, wherein when the measured value of the dark current is a predetermined value or larger, the drive method switching circuit sets the pulse drive as the drive method of the drive circuit, and when the measured value of the dark current is smaller than the predetermined value, the drive method switching circuit sets the linear drive.

3. An image pickup module comprising:
   a lens,
   a lens support unit that supports the lens in a freely moveable manner in an optical axis direction,
   an image pickup unit that detects light from the lens and outputs an image signal,
   an operation information storage unit that stores therein information about an operating state of the image pickup unit,
   a lens drive control unit having a drive circuit for driving the lens in the optical axis direction and a drive method switching circuit for switching a drive method of the drive circuit between a linear drive and a pulse drive, and
   an image determination unit that determines whether the output signal of the image pickup unit is to record an image or not and outputs determination information thereof,
   wherein the drive method switching circuit switches the lens drive control unit to an optimal drive method in accordance with the operating state information stored in the operation information storage unit,
   wherein the operation information storage unit stores the determination information from the image determination unit as the operating state information, and
   wherein the drive method switching circuit switches the drive method of the drive circuit in accordance with the stored determination information.

4. The image pickup module according to claim 3, wherein when the output signal of the image pickup unit is an image signal for image recording, the drive method switching circuit sets the linear drive, and when the output signal is not an image signal for image recording, the drive method switching circuit sets the pulse drive.

* * * * *